US 6,597,158 B2

(12) United States Patent
Umeda

(10) Patent No.: US 6,597,158 B2
(45) Date of Patent: Jul. 22, 2003

(54) ADJUSTABLE CURRENT CONSUMPTION POWER SUPPLY APPARATUS

(75) Inventor: Hiroyuki Umeda, Nagoya (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/057,308

(22) Filed: Jan. 25, 2002

(65) Prior Publication Data

US 2002/0109488 A1 Aug. 15, 2002

(30) Foreign Application Priority Data

Jan. 29, 2001 (JP) ........................................ 2001-020703

(51) Int. Cl.[7] ................................................ G05F 1/59
(52) U.S. Cl. ........................ 323/268; 323/272; 363/65
(58) Field of Search ................................. 323/268, 269, 323/271, 272, 273, 282; 363/59, 60, 62, 65

(56) References Cited

U.S. PATENT DOCUMENTS

| | | | | |
|---|---|---|---|---|
| 4,194,147 A | * | 3/1980 | Payne | |
| 4,502,152 A | * | 2/1985 | Sinclair | ........................ 323/268 |
| 4,581,694 A | * | 4/1986 | Adams | ......................... 323/268 |
| 5,083,078 A | * | 1/1992 | Kubler et al. | ................ 323/268 |
| 5,267,136 A | * | 11/1993 | Suga et al. | ................... 323/271 |
| 6,060,869 A | * | 5/2000 | Shimoda | ..................... 323/271 |
| 6,249,110 B1 | * | 6/2001 | Geyer et al. | ................. 323/272 |
| 6,424,128 B1 | * | 7/2002 | Hiraki et al. | ................ 323/272 |

* cited by examiner

*Primary Examiner*—Jeffrey Sterrett
(74) *Attorney, Agent, or Firm*—Harness, Dickey & Pierce, P.L.C.

(57) ABSTRACT

A DC/DC converter and a series regulator are connected in parallel between an input terminal and an output terminal. At the time of a heavy load, the DC/DC converter is operated. Although the DC/DC converter has a large current consumption of its own, it has a high power conversion efficiency. Accordingly, since a load current increases at the time of a heavy load, it is effective to use the DC/DC converter whose power conversion efficiency is high, and its current consumption can be neglected since the load current is large. On the other hand, at the time of a light load, the series regulator is operated. Although the series regulator has a small current consumption of its own, it has a low power conversion efficiency. Accordingly, at the time of a light load, even when the series regulator is used, its low power conversion efficiency can be neglected because its current consumption is small. Accordingly, the current consumption of its own can be lowered at the time of a light load, and the power conversion efficiency as a whole can be improved when it is used both at a heavy load and a light load.

12 Claims, 4 Drawing Sheets

US 6,597,158 B2

ADJUSTABLE CURRENT CONSUMPTION POWER SUPPLY APPARATUS

Japanese Patent Application No. 2001-20703, filed Jan. 29, 2001, is hereby incorporated by reference in its entirety.

BACKGROUND OF THE INVENTION

The present invention relates to a power supply apparatus that reduces its own current consumption at the time of a light load to thereby eliminate power wastage, to thereby improve an overall power conversion efficiency thereof.

Conventionally, for example, charge pump DC/DC converters and switching regulators are known as power supply apparatuses.

A charge pump DC/DC converter uses charge and discharge of a capacitor to convert an input voltage to a given output voltage.

A switching regulator switches an input voltage and converts the input voltage to a given output voltage.

However, since a charge pump DC/DC converter is designed taking in account of the maximum load for its operation, its own current consumption is the same even when a load condition changes. Therefore, it does not waste the power at the time of a heavy load, but it is inconvenient that its capacity becomes excessive at the time of a light load such that the power is wasted, and the overall power conversion efficiency is lowered.

On the other hand, a switching regulator has a large current consumption but a high power convention efficiency. Accordingly, its high power conversion efficiency is effective at the time of a heavy load. However, it is inconvenient that the overall power conversion efficiency is lowered because its own current consumption is large at the time of a light load.

BRIEF SUMMARY OF THE INVENTION

In view of the above, the present invention may provide a power supply apparatus that reduces its own current consumption at the time of a light load, to thereby improve an overall power conversion efficiency thereof.

One aspect of the present invention relates to a power supply apparatus comprising: an input terminal; an output terminal; a charge pump DC/DC converter provided between the input terminal and the output terminal; and a series regulator connected in parallel with the charge pump DC/DC converter between the input terminal and the output terminal, wherein the charge pump DC/DC converter and the series regulator are selectively operated according to size of a load connected to the output terminal.

In this manner, in accordance with this aspect of the present invention, a charge pump DC/DC converter and a series regulator having different characteristics are combined, and the DC/DC converter and the series regulator are selectively operated according to size of a load to take out an output voltage on an operation side thereof.

More concretely, at the time of a heavy load, the DC/DC converter is operated. Although the DC/DC converter has a large current consumption of its own, it has a high conversion efficiency of an output power with respect to an input power. Accordingly, since a load current increases at the time of a heavy load, it is effective to use the DC/DC converter the power conversion efficiency of which is high, and its current consumption can be neglected since the load current is large.

On the other hand, at the time of a light load, the series regulator is operated. Although the series regulator has a small current consumption of its own, it has a low power conversion efficiency. Accordingly, at the time of a light load, when the series regulator is used, its low power conversion efficiency can be neglected because its current consumption is small.

Accordingly, since its current consumption can be lowered at the time of a light load compared to that at the time of a heavy load, the power conversion efficiency as a whole can be improved when it is used both at a heavy load and a light load.

Another aspect of the present invention relates to a power supply apparatus comprising: an input terminal; an output terminal; a switching regulator provided between the input terminal and the output terminal; and a series regulator connected in parallel with the switching regulator between the input terminal and the output terminal, wherein the switching regulator and the series regulator are selectively operated according to size of a load connected to the output terminal.

In this manner, in accordance with this aspect of the present invention, a switching regulator and a series regulator having different characteristics are combined, and the switching regulator and the series regulator are selectively operated according to size of a load to take out an output voltage on an operation side thereof.

More concretely, when the load is heavy, the switching regulator is operated. Although the switching regulator has a large current consumption of its own, it has a high conversion efficiency of an output power with respect to an input power. Accordingly, since a load current increases at the time of a heavy load, it is effective to use the switching regulator the power conversion efficiency of which is high, and its current consumption can be neglected since the load current is large.

On the other hand, at the time of a light load, the series regulator is operated. Although the series regulator has a small current consumption of its own, it has a low power conversion efficiency. Accordingly, at the time of a light load, when the series regulator is used, its low power conversion efficiency can be neglected because its current consumption is small.

Accordingly, since its current consumption can be reduced at the time of a light load compared to that at the time of a heavy load, the power conversion efficiency as a whole can be improved when it is used both at heavy load and light load.

DETAILED DESCRIPTION OF THE EMBODIMENT

A power supply apparatus in accordance with a first embodiment of the present invention is described below with reference to FIG. 1.

Figure 1:
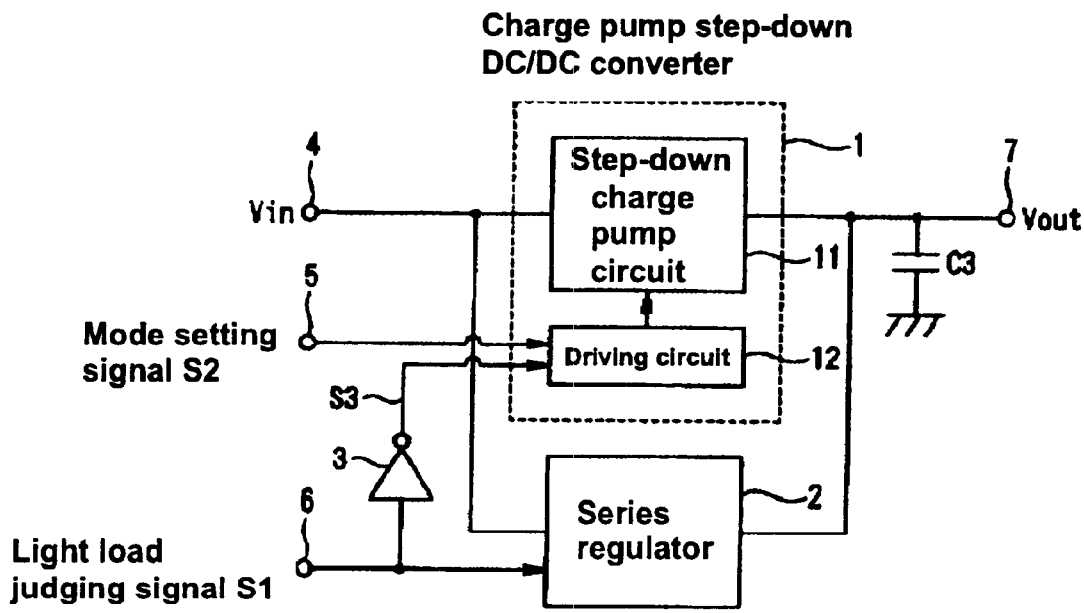
FIG. 1 shows a block diagram of a structure of a power supply apparatus in accordance with a first embodiment of the present invention.

As shown in FIG. 1, the power supply apparatus in accordance with the first embodiment of the present invention is equipped with a charge pump step-down DC/DC converter 1 and a series regulator 2 connected in parallel between an input terminal 4 and an output terminal 7, The step-down DC/DC converter 1 and the series regulator 2 are selectively operated based on a light load judging signal S1, and an output voltage on the operating side is taken out from an output terminal 3.

The step-down DC/DC converter 1 uses charge and discharge of a capacitor to convert an input voltage Vin that is input in the input terminal 4 into a given output voltage Vout, and is formed from a step-down charge pump circuit 11 and a driving circuit 12 that drives the step-down charge pump circuit 11.

Figure 2:
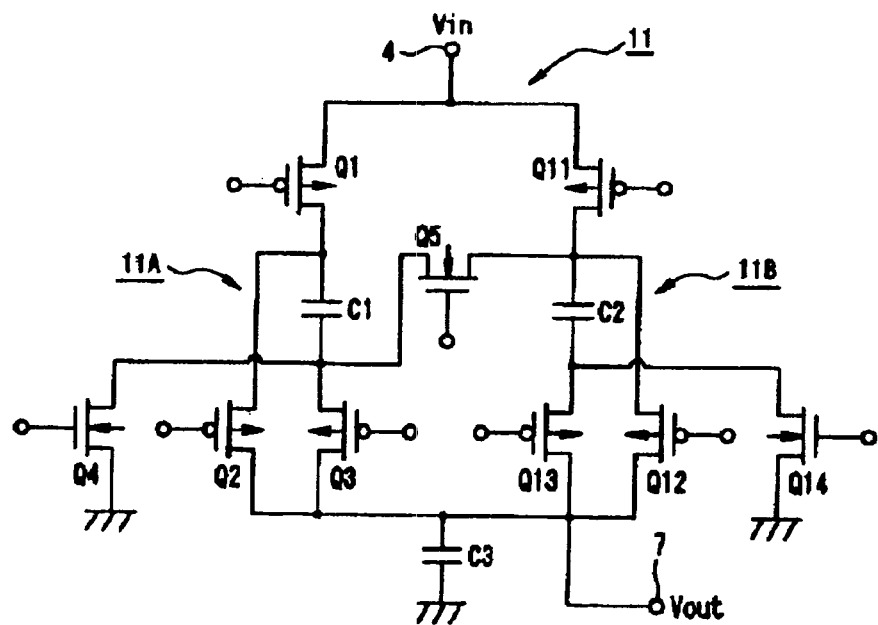
FIG. 2 shows a circuit diagram of a concrete structure of a step-down charge pump circuit.

The step-down charge pump circuit 11 is formed from, for example, as shown in FIG. 2, a first charge pump circuit 11A that is composed of switching MOS transistors Q1 to Q4 and a capacitor C1, a second charge pump circuit 12A that is composed of switching MOS transistors Q11 to Q14 and a capacitor C2, a switching MOS transistor Q5 that is capable of connecting the first charge pump circuit 11A and the second charge pump circuit 12A, and a capacitor C3 for output.

The above is described in a greater detail. The MOS transistor Q1 has a source that is connected to the input terminal 4 and a drain that is connected to a source of the MOS transistor Q3 through the capacitor C1. A drain of the MOS transistor Q3 is connected to an output terminal 7. Also, the MOS transistor Q2 has a source that is connected to the drain of the MOS transistor Q1 and a drain that is connected to the output terminal 7. Furthermore, the MOS transistor Q4 has a drain that is connected to the source of the MOS transistor Q3 and a source of the MOS transistor Q5, and has a source that is grounded. The capacitor C3 is connected between the output terminal 7 and the ground.

The MOS transistor Q11 has a source that is connected to the input terminal 4 and a drain that is connected to a source of the MOS transistor Q13 through the capacitor C2 and also to a drain of the MOS transistor Q5. A drain of the MOS transistor Q13 is connected to the output terminal 7. Also, the MOS transistor Q12 has a source that is connected to the drain of the MOS transistor Q11 and a drain that is connected to the output terminal 7. Furthermore, the MOS transistor Q14 has a drain that is connected to the source of the MOS transistor Q13 and a source thereof connected to the ground.

Given driving signals are input from the driving circuit 12 shown in FIG. 1 to respective gates of the MOS transistors Q1 to Q5 and Q11 to Q14, so that the MOS transistors Q1 to Q5 and Q11 to Q14 are controlled to turn on and off by the driving signals.

The driving circuit 12 generates driving signals that drive the MOS transistors Q1 to Q5 and Q11 to Q14 of the step-down charge pump circuit 11 based on an oscillation signal provided by an oscillation circuit (not shown) according to a mode that is set by a mode setting signal S2 which is input in a mode setting terminal 5.

Modes that can be set by the mode setting signal S1 include a mode of complementarily driving or non-complimentarily driving the step-down charge pump circuit 11, and a mode of a step-down amplification of input voltage (for example, at 1/1 amplification, 1/2 amplification, 2/3 amplification or the like).

Also, the driving circuit 12 can stop its operation or prohibit its output based on an inverted signal S3 that is provided by inverting the light load judging signal S2 input in a control input terminal 6 by an inverter 3.

Figure 3:
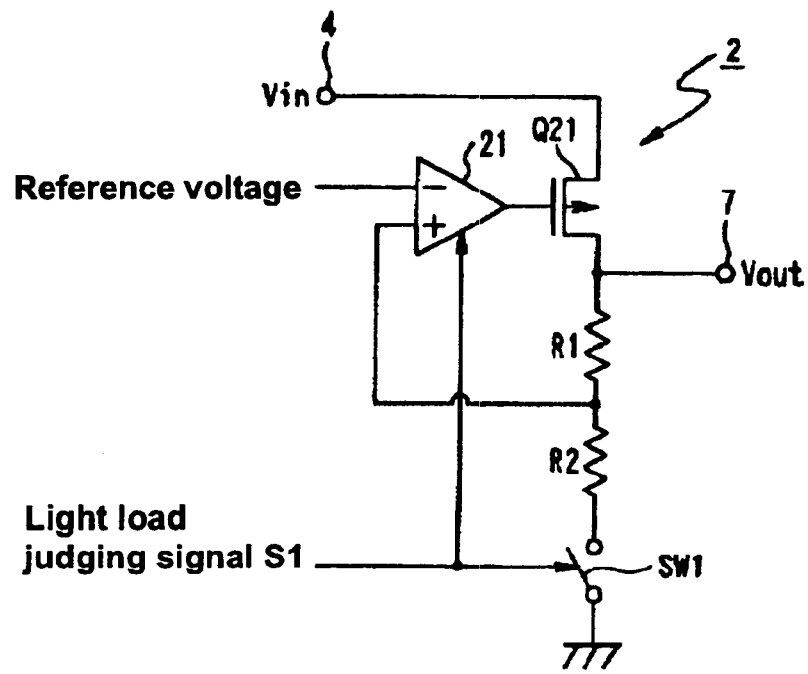
FIG. 3 shows a circuit diagram of a concrete structure of a series regulator.

The series regulator 2 receives an input voltage Vin, and continuously controls its output voltage Vout so that the output voltage Vout becomes a given voltage, and has a structure shown in FIG. 3, for example.

More particularly, in the series regulator 2, a MOS transistor Q21 is connected between an input terminal 4 and an output terminal 7, and a resistor R1, a resistor R2 and a switch SW1 are serially connected between the output terminal 7 and a ground. An error amplifier 21 compares a divided voltage obtained by dividing the output voltage Vout by the resistors R1 and R2 with a reference voltage, and applies an output voltage according to the comparison to a gate of the MOS transistor Q21 to thereby control the on-resistance of the MOS transistor Q21, so that a given output voltage can be obtained.

The error amplifier 21 controls to turn on and off its output voltage by the light load judging signal S1 input in the control input terminal 6. Also, the switch SW1 is controlled to open or close by the light load judging signal S1.

Next, an operation of the first embodiment having the composition described above is described with reference to the drawings.

When the load in the first embodiment is heavy, the light load judging signal S1 becomes, for example, an "L" level. As a result, the light load judging signal S1 is input unchanged in the error amplifier 21 and the switch SW1 of the series regulator 2, and it is inverted by the inverter 3 to an "H" level and then input in the driving circuit 12 of the step-down DC/DC converter 1.

As a result, on the side of the step-down DC/DC converter 1, the driving circuit 12 is placed in an operation state or in a state in which driving signals can be output. Accordingly, given driving signals from the driving circuit 12 according to the mode set by the mode setting signal S2 are input in the corresponding gates of the MOS transistors Q1 to Q5 and Q11 to Q14. As a result, the step-down charge pump circuit 11 operates according to the set mode, and generates a given output voltage Vout, which is output to the output terminal 7.

Meanwhile, on the side of the series regulator 2, outputs from the error amplifier 21 are prohibited, and the switch SW1 is placed in an open state, such that the series regulator 2 does not operate, or does not generate any output voltage.

Next, when the load in the first embodiment is light, the light load judging signal S1 becomes, for example, an "H" level. As a result, the light load judging signal S1 is input unchanged in the error amplifier 21 and the switch SW1 of the series regulator 2, and it is inverted by the inverter 3 to an "L" level and then input in the driving circuit 12 of the step-down DC/DC converter 1.

As a result, on the side of the step-down DC/DC converter 1, the driving circuit 12 is placed in a state in which its operation is stopped or in a state in which outputs of driving signals are prohibited. Accordingly, the driving circuit 12 does not output any driving signals, such that the step-down charge pump circuit 11 stops its operation and any output voltage is generated.

Meanwhile, on the side of the series regulator 2, it is placed in a state in which an output voltage from the error amplifier 21 can be output, and the switch SW1 is placed in a closed state, such that the series regulator 2 is placed in an operation state, and its output voltage is output to the output terminal 7.

Next, one example in which the step-down charge pump circuit 11 operates according to a mode set by the mode setting signal S2 is described with reference to FIGS. 4A, 4B, 5A and 5B.

First, one case is described with reference to FIGS. 4A and 4B where a mode is set in a complementary operation and at a step-down voltage in 1/1 amplification.

Figure 4:
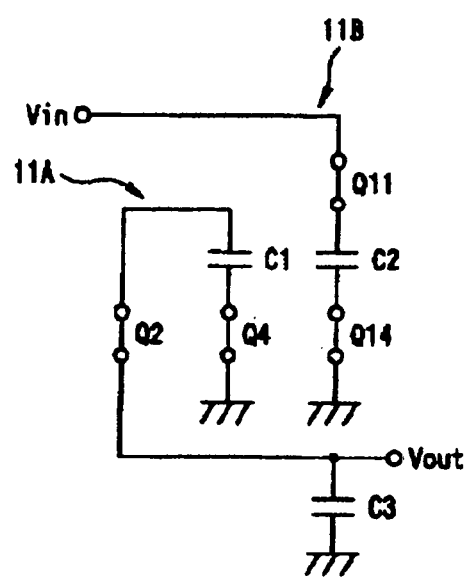
FIGS. 4A and 4B show diagrams that are used to describe an example of an operation of the step-down charge pump circuit.
Figure 4:
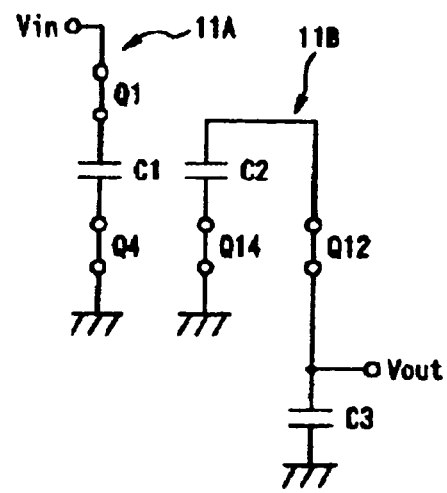

In this case, the first and second charge pump circuits 11A and 11B are placed in a state shown in FIG. 4A in a first period, and in a state shown in FIG. 4B in a second period. The operations in the first period and the second period are alternately repeated.

In other words, in the first period, in the first charge pump circuit 11A, only the MOS transistors Q2 and Q4 are turned on by the driving circuit 12, and a charged voltage of the capacitor C1 in the second period in a previous round becomes to be an output voltage Vout (see FIG. 4A).

Also, in the same first period, in the second charge pump circuit 11B, only the MOS transistors Q11 and Q14 are turned on by the driving circuit 12, and the capacitor C2 is charged with an input voltage Vin (see FIG. 4A).

In contrast, in the second period, in the first charge pump circuit 11A, only the MOS transistors Q1 and Q4 are turned on by the driving circuit 12, and the capacitor C2 is charged with an input voltage Vin (see FIG. 4B).

Also, in the same second period, in the second charge pump circuit 11B, only the MOS transistors Q12 and Q14 are turned on by the driving circuit 12, and a charged voltage of the capacitor C2 in the first period becomes to be an output voltage Vout (see FIG. 4B).

Next, one case is described with reference to FIGS. 5A and 5B where a mode is set in a complementary operation and at a step-down voltage in 1/2 amplification.

Figure 5:
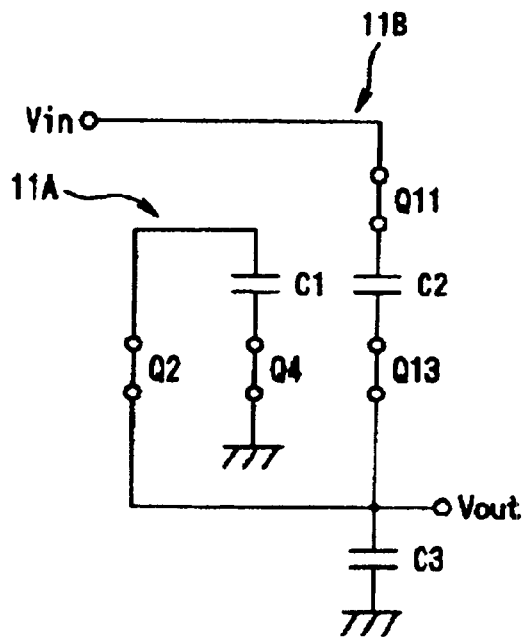
FIGS. 5A and 5B show diagrams that are used to describe another example of an operation of the step-down charge pump circuit.
Figure 5:
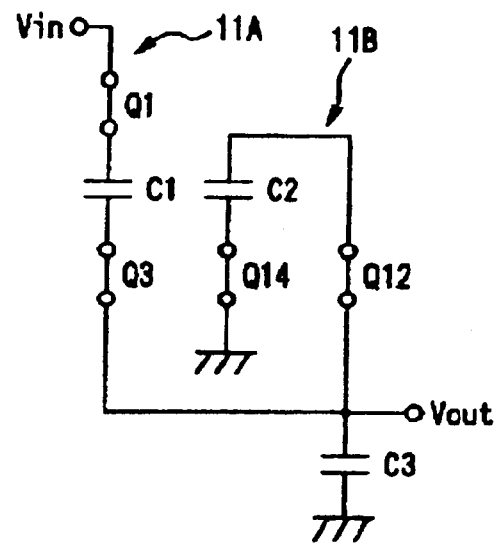

In this case, the first and second charge pump circuits 11A and 11B are placed in a state shown in FIG. 5A in a first period, and in a state shown in FIG. 5B in a second period. The operations of the first period and the second period are alternately repeated. A detailed description thereof is omitted here.

As described above, in the first embodiment, the charge pump step-down DC/DC converter 1 is operated when the load is heavy. Although the step-down DC/DC converter 1 has a large current consumption of its own, for example, at 100 $\mu$A, it has a high conversion efficiency of an output power with respect to an input power (a power conversion efficiency), for example, at 90%. Accordingly, since a load current increases at the time of a heavy load, it is effective to use the step-down DC/DC converter 1 whose power conversion efficiency is high, and its current consumption can be neglected since the load current is large.

On the other hand, at the time of a light load, the series regulator 2 is operated. Although the series regulator 2 has a small current consumption of its own, for example, at 1 $\mu$A, it has a low power conversion efficiency, for example, at 60%. Accordingly, at the time of a light load, when the series regulator 2 is used, its low power conversion efficiency can be neglected because its current consumption is small.

Accordingly, in accordance with the first embodiment, since its current consumption can be reduced at the time of a light load compared to at the time of a heavy load, the power conversion efficiency as a whole can be improved when it is used both at heavy load and light load. For this reason, in particular, when a battery-operated electronic appliance is operated in a stand-by state, wasteful power consumption of the battery can be prevented, and the battery can be used for a longer time.

It is noted that, in the first embodiment, the step-down DC/DC converter 1 and the series regulator 2 are selectively operated to take out an output voltage at an operation side thereof. Accordingly, it is necessary to prevent occurrence of a period in which no output voltage is generated when the operations are switched from one to the other. A device that copes with this point is described.

First, a case in which an operation of the step-down DC/DC converter 1 is switched to an operation of the series regulator 2 is described.

In this instance, the light load judging signal S1 changes from an "L" level to an "H" level, which immediately sets a state in which the error amplifier 21 on the side of the series regulator 2 can output an output voltage, and the switch SW1 is closed. As a result, the series regulator 2 immediately starts its operation.

Meanwhile, an appropriate device may be used to detect a change in the light load judging signal S1. A timer (not shown) is started upon detection thereof and counts a given time, and a finish signal is generated after the counting is completed. Then, the finish signal is used to set a state in which the driving circuit 12 on the side of the step-down DC/DC converter 1 stops its operation or a state in which outputs of the driving signals are prohibited. As a result, the step-down DC/DC converter starts its operation after the operation of the series regulator 2 becomes stable.

The operation described above prevents occurrence of a period in which no output voltage is generated when an operation of the step-down DC/DC converter 1 is switched to an operation of the series regulator 2.

Next, conversely, a case in which an operation of the series regulator 2 is switched to an operation of the step-down DC/DC converter 1 is described.

In this instance, the light load judging signal S1 changes from an "H" level to an "L" level, which is converted by the inverter 3 and input in the driving circuit 12 on the side of the step-down DC/DC converter 1. As a result, the driving circuit 12 immediately shifts to an operation state or a state in which driving signals can be output, and the step-down DC/DC converter 1 immediately starts its operation.

Meanwhile, an appropriate device may be used to detect a change in the light load judging signal S1. A timer is started upon detection thereof and counts a given time, and a finish signal is generated after the counting is completed. Then, the finish signal is used to set a state in which the error amplifier 21 on the side of the series regulator 2 does not output an output voltage, and the switch SW1 is opened. As a result, the series regulator 2 stops its operation after the operation of the step-down DC/DC converter 1 becomes stable.

The operation described above prevents occurrence of a period in which no output voltage is generated when an operation of the series regulator 2 is switched to an operation of the step-down DC/DC converter 1.

Next, a power supply apparatus in accordance with a second embodiment of the present invention is described with reference to FIG. 6.

Figure 6:
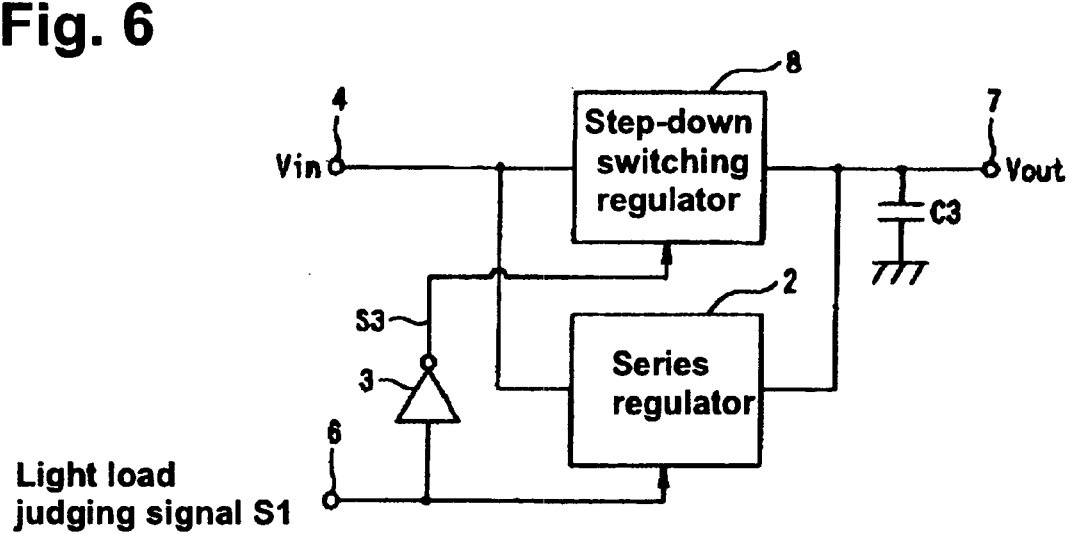
FIG. 6 shows a block diagram of a structure of a power supply apparatus in accordance with a second embodiment of the present invention.

As shown in FIG. 6, the power supply apparatus in accordance with the second embodiment of the present invention is equipped with a step-down switching regulator 8 and a series regulator 2 connected in parallel between an input terminal 4 and an output terminal 7. The step-down switching regulator 8 and the series regulator 2 are selectively operated based on a light load judging signal S1, and an output voltage on an operation side thereof is taken out from an output terminal 3.

The series regulator 2 is the same as the series regulator 2 shown in FIG. 1 and FIG. 3.

Figure 7:
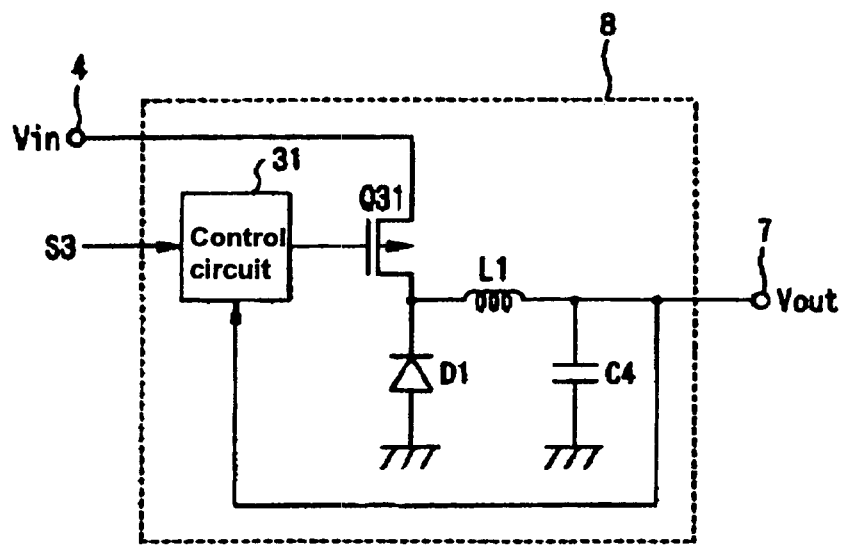
FIG. 7 shows a circuit diagram of a concrete structure of a step-down switching regulator.

The step-down switching regulator 8 switches an input voltage and converts the input voltage into a given output voltage, and has a structure shown in FIG. 7, for example.

The step-down switching regulator 8 includes a MOS transistor Q31 and a coil L1 serially connected between an input terminal 4 and output terminal 7. Also, one end of the coil L1 is connected to a ground through a diode D1, and the other end of the coil L1 is connected to a ground through a capacitor C4.

A control circuit 31 generates a switching signal whose pulse frequency or pulse width changes according to size of an output voltage Vout, and controls to turn on and off the MOS transistor Q31 by the switching signal, whereby a required output voltage is obtained.

Also, the control circuit 31 is placed to stop its operation or is prohibited from providing outputs based on an inverted signal S3 that is provided by inverting the light load judging signal S1 input from a control input terminal 6 by an inverter 3.

Next, an operation of the second embodiment having the composition described above is described with reference to the drawings.

When the load in the second embodiment is heavy, the light load judging signal S1 becomes, for example, an "L" level. As a result, the light load judging signal S1 is input unchanged in an error amplifier 21 and a switch SW1 of the series regulator 2, and it is inverted by the inverter 3 to an "H" level to an inverted signal S3, which is then input in the control circuit 31 of the step-down switching regulator 8.

As a result, on the side of the step-down switching regulator 8, the control circuit 31 is placed in an operation state or in a state in which it can provide outputs. Accordingly, the step-down switching regulator 8 is placed in an operation state, such that a required output voltage is obtained.

Meanwhile, on the side of the series regulator 2, the error amplifier 21 does not output an output voltage, and the switch SW1 is placed in an open state, such that the series regulator 2 does not generate any output voltage.

Next, when the load in the first embodiment is light, the light load judging signal S1 becomes, for example, an "H" level. As a result, the light load judging signal S1 is input unchanged in the error amplifier 21 and the switch SW1 of the series regulator 2, and it is inverted by the inverter 3 to an "L" level to an inverted signal S3, which is then input in the control circuit 31 of the step-down switching regulator 8.

As a result, on the side of the step-down switching regulator 8, the control circuit 31 is placed in a state in which its operation is stopped or in a state in which outputs of driving signals are prohibited. Accordingly, the control circuit 31 does not output any switching signals, such that the step-down switching regulator 8 stops its operation and no output voltage is output therefrom.

Meanwhile, on the side of the series regulator 2, it is placed in a state in which an output voltage from the error amplifier 21 can be output, and the switch SW1 is placed in a closed state, such that the series regulator 2 is placed in an operation state, and its output voltage is output to the output terminal 7.

As described above, in the second embodiment, the step-down switching regulator 8 is operated at the time when the load is heavy. Although the step-down switching regulator 8 has a large current consumption of its own, for example, at 100 $\mu$A, it has a high conversion efficiency of an output power with respect to an input power (a power conversion efficiency), for example, at 90%. Accordingly, since a load current increases at the time of a heavy load, it is effective to use the step-down switching regulator 8 whose power conversion efficiency is high, and its current consumption can be neglected since the load current is large.

On the other hand, at the time of a light load, the series regulator 2 is operated. Although the series regulator 2 has a small current consumption of its own, for example, at 1 $\mu$A, it has a low power conversion efficiency, for example, at 60%. Accordingly, at the time of a light load, when the series regulator 2 is used, its low power conversion efficiency can be neglected because its current consumption is small.

Accordingly, in accordance with the second embodiment, since its current consumption can be reduced at the time of a light load compared to that at the time of a heavy load, the power conversion efficiency as a whole can be improved when it is used both at a heavy load and a light load. For this reason, in particular, when a battery-operated electronic appliance is operated in a stand-by state, wasteful power consumption of the battery can be prevented, and the battery can be used for a longer time.

It is noted that, in the second embodiment, the step-down switching regulator 8 and the series regulator 2 are selectively operated to take out an output voltage at an operation side thereof. Accordingly, it is necessary to prevent occurrence of a period in which no output voltage is generated when the operations are switched from one to the other. A device that copes with this point is described.

First, a case in which an operation of the step-down switching regulator 8 is switched to an operation of the series regulator 2 is described.

In this instance, the light load judging signal S1 changes from an "L" level to an "H" level, which immediately sets a state in which the error amplifier 21 on the side of the series regulator 2 can output an output voltage, and the switch SW1 is closed. As a result, the series regulator 2 immediately starts its operation.

Meanwhile, an appropriate device may be used to detect a change in the light load judging signal S1. A timer is started upon detection thereof and counts a given time, and a finish signal is generated after the counting is completed. Then, the finish signal is used to set a state in which the control circuit 31 on the side of the step-down switching regulator 8 stops its operation or a state in which outputs of the driving signals are prohibited. As a result, the step-down switching regulator 8 starts its operation after the operation of the series regulator 2 becomes stable.

The operation described above prevents occurrence of a period in which no output voltage is generated when an operation of the step-down switching regulator 8 is switched to an operation of the series regulator 2.

Next, conversely, a case in which an operation of the series regulator 2 is switched to an operation of the step-down switching regulator 8 is described.

In this instance, the light load judging signal S1 changes from an "H" level to an "L" level, which is converted by the inverter 3 and input in the control circuit 31 on the side of the step-down switching regulator 8. As a result, the control circuit 31 immediately shifts to an operation state or a state in which driving signals can be output. As a result, the step-down switching regulator 8 immediately starts its operation.

Meanwhile, an appropriate device may be used to detect a change in the light load judging signal S1. A timer is started upon detection thereof and counts a given time, and a finish signal is generated after the counting is completed. Then, the finish signal is used to set a state in which the error amplifier 21 on the side of the series regulator 2 does not output an output voltage, and the switch SW1 is opened. As a result, the series regulator 2 stops its operation after the operation of the step-down switching regulator 8 becomes stable.

The operation described above prevents occurrence of a period in which no output voltage is generated when an operation of the series regulator 2 is switched to an operation of the step-down switching regulator 8.

As described above, the present invention provides a power supply apparatus that can reduce its current consumption at the time of a light load, and improve its overall power conversion efficiency.

What is claimed is:

1. A power supply apparatus comprising:
   an input terminal;
   an output terminal;
   a charge pump DC/DC converter connected between the input terminal and the output terminal;
   a series regulator connected in parallel with the charge pump DC/DC converter between the input terminal and the output terminal, and
   a control input terminal connected to the charge pump DC/DC converter and the series regulator, wherein the charge pump DC/DC converter and the series regulator are selectively operated according to a control signal input to the control input terminal and the control signal changes according to a size of a load connected to the output terminal.

2. The power supply apparatus according to claim 1, wherein the charge pump DC/DC converter is operated to convert an input voltage from the input terminal into a given output voltage using charge and discharge of a capacitor and to output the output voltage to the output terminal when the load is large.

3. The power supply apparatus according to claim 1, wherein the series regulator is operated to continuously control the input voltage from the input terminal so that the input voltage becomes a given output voltage and to output the output voltage to the output terminal when the load is small.

4. The power supply apparatus according to claim 1, wherein there is no period in which no output voltage is generated when an operation of the charge pump DC/DC converter is switched to an operation of the series regulator.

5. A power supply apparatus comprising:
   an input terminal;
   an output terminal;
   a charge pump DC/DC converter connected between the input terminal and the output terminal;
   a series regulator connected in parallel with the charge pump DC/DC converter between the input terminal and the output terminal;
   a control input terminal connected to the charge pump DC/DC converter and the series regulator, a light load judging signal being input in the control input terminal;
   a first timer; and
   a second timer,
   wherein the first timer first detects a change in the light load judging signal, counts a given time upon detection of the change and outputs a finish signal to the charge pump DC/DC converter after the counting is completed, when an operation of the charge pump DC/DC converter is switched to an operation of the series regulator, and
   wherein the second timer first detects a change in the light load judging signal, counts a given time upon detection of the change and outputs a finish signal to the series regulator after the counting is completed, when an operation of the series regulator is switched to an operation of the charge pump DC/DC converter.

6. A power supply apparatus comprising:
   an input terminal;
   an output terminal;
   a switching regulator connected between the input terminal and the output terminal;
   a series regulator connected in parallel with the switching regulator between the input terminal and the output terminal, and
   a control input terminal connected to the switching regulator and the series regulator, wherein the switching regulator and the series regulator are selectively operated according to a control signal input to the control input terminal and the control signal changes according to a size of a load connected to the output terminal.

7. The power supply apparatus according to claim 6, wherein the switching regulator is operated to switch an input voltage from the input terminal and convert the input voltage into a given output voltage, and to output the output voltage to the output terminal when the load is large.

8. The power supply apparatus according to claim 6, wherein the series regulator is operated to continuously control the input voltage from the input terminal so that the input voltage becomes a given output voltage and to output the output voltage to the output terminal when the load is small.

9. The power supply apparatus according to claim 6, wherein there is no period in which no output voltage is generated when an operation of the switching regulator is switched to an operation of the series regulator.

10. A power supply apparatus comprising:
    an input terminal;
    an output terminal;
    a switching regulator connected to the input terminal and the output terminal;
    a series regulator connected in parallel with the switching regulator between the input terminal and the output terminal;
    a control input terminal connected to the switching regulator and the series regulator, a light load judging signal being input in the control input terminal;
    a first timer; and
    a second timer,
    wherein the first timer first detects a change in the light load judging signal, counts a given time upon detection of the change and outputs a finish signal to the series regulator after the counting is completed, when an operation of the series regulator is switched to an operation of the switching regulator, and
    wherein the second timer first detects a change in the light load judging signal, counts a given time upon detection of the change and outputs a finish signal to the switching regulator after the counting is completed, when an operation of the switching regulator is switched to an operation of the series regulator.

11. A power supply apparatus comprising:

an input terminal;

an output terminal;

a charge pump DC/DC converter connected to the input terminal and the output terminal;

a series regulator connected to the input terminal and the output terminal, wherein the series regulator is connected in parallel with the charge pump DC/DC converter;

a control input terminal connected to the charge pump DC/DC converter and the series regulator; and a control signal applied to the control input terminal, wherein the charge pump DC/DC converter and the series regulator are selectively operated according to the control signal and the control signal changes according to a size of a load connected to the output terminal.

12. A power supply apparatus comprising:

an input terminal;

an output terminal;

a switching regulator connected to the input terminal and the output terminal;

a series regulator connected to the input terminal and the output terminal, wherein the series regulator is connected in parallel with the switching regulator;

a control input terminal connected to the switching regulator and the series regulator; and a control signal applied to the control input terminal, wherein the switching regulator and the series regulator are selectively operated according to the control signal and the control signal changes according to a size of a load connected to the output terminal.

* * * * *